UNITED STATES PATENT OFFICE.

EMILE BRONNERT, OF NIEDERMORSCHWEILER, NEAR MÜLHAUSEN, GERMANY, ASSIGNOR TO THE FIRM OF VEREINIGTE GLANZSTOFF-FABRIKEN A.-G., OF ELBERFELD, GERMANY.

TRANSFORMING FORMYL ESTERS OF CELLULOSE OR SOLUTIONS OF THE SAME INTO STABLE PLASTIC SOLUTIONS.

1,029,341.      Specification of Letters Patent.      Patented June 11, 1912.

No Drawing.      Application filed March 25, 1911. Serial No. 616,993.

*To all whom it may concern:*

Be it known that I, EMILE BRONNERT, a subject of the Emperor of Germany, and residing at 17 Mülhauserstrasse, Niedermorschweiler, near Mülhausen, Germany, have invented certain new and useful Improvements in Transforming Formyl Esters of Cellulose or Solutions of the Same into Stable Plastic Solutions, of which the following is a specification.

My invention relates to a method of transforming the formyl esters of cellulose, or solutions of the same, into stable plastic solutions.

It relates particularly to a method in which the formyl esters, or solutions of cellulose in formic acid, are treated with lactic acid to form stable plastic solutions.

There are several methods known, by means of which the formyl esters of cellulose are produced. The best, cheapest, and most widely known, (in consequence of its simultaneous use, under certain circumstances, as an estering medium), is that by formic acid itself without any further condensing substance. Formic acid, as is well known, possesses strong caustic qualities, which for many uses, make its application prohibitively disagreeable. It became, therefore, an important technological problem to find a material which was a solvent, cheap and not caustic.

My invention is based upon the unexpected discovery that lactic acid possesses the property of dissolving formyl cellulose. I have found that the solutions, produced warm, on cooling, set to a plastic, stable solution, which is capable of manifold application. The acid reaction can eventually be removed from the stable solution, for example, by dialysis with water.

In German Patent, No. 233,589 of December 18, 1909, (to which my U. S. application, S. No. 575,518, filed August 4, 1910, corresponds) and in German Patent No. 214398, of July 23rd, 1908, I have shown a process in which, under a gentle heat, the waste products of artificial silk say 7 parts are swelled up and dissolved in formic acid, say 100 parts. To this solution I add lactic acid to a sufficient amount, say 50 parts. The formic acid is then distilled off in the water bath, *in vacuo*, and is thus regained to be again used. The tough, ductile, crystal clear syrup that remains, sets, on cooling to a clear, stable, plastic solution (jelly).

I claim:

1. A composition of matter consisting of formyl esters of cellulose dissolved in lactic acid.

2. The method of dissolving formyl cellulose, which consists in dissolving it in lactic acid.

3. The method of producing a solution of formyl cellulose, which consists in dissolving the formyl cellulose in formic acid; mixing the solution thus formed with lactic acid; distilling off and collecting the formic acid, and cooling the remaining solutions.

4. The method of producing a solution of formyl cellulose, which consists in dissolving the formyl cellulose, under the influence of a gentle heat, in formic acid; adding thereto lactic acid, distilling off, under vacuum, the formic acid, and allowing the resulting solutions to cool.

5. The method of producing solutions of formyl cellulose, which consists in dissolving, under the influence of heat, in formic acid, the waste products of artificial silk; adding thereto lactic acid; distilling off in a vacuum the formic acid; separately collecting the latter, and cooling the resulting solution.

In witness whereof, I have hereunto signed my name in the presence of two subscribing witnesses.

EMILE BRONNERT.

Witnesses:
WALTER OHLINSTAYER,
MAX FROMAG.